Dec. 23, 1924.  
W. KRAUSE  
PIPE JOINT  
Filed May 21, 1920
1,520,028
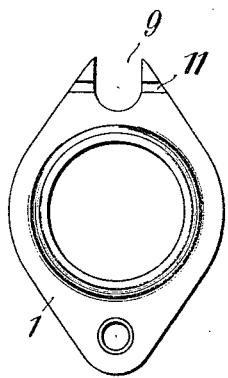
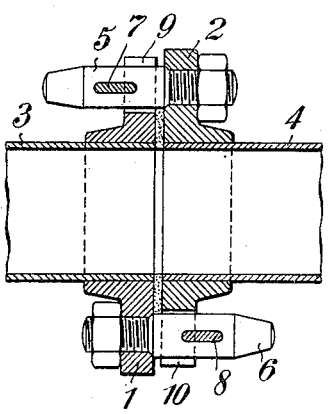
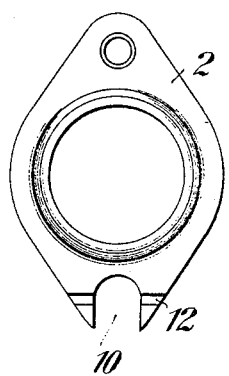
Witnesses:  
Daniel Mathé  
[signature]
Inventor:  
Walter Krause  
by John Lotka  
Attorney Patented Dec. 23, 1924.

1,520,028

UNITED STATES PATENT OFFICE.

WALTER KRAUSE, OF FRIESACK, GERMANY.

PIPE JOINT.

Application filed May 21, 1920. Serial No. 383,323.

(GRANTED UNDER THE PROVISIONS OF THE ACT OF MARCH 3, 1921, 41 STAT. L., 1313.)

*To all whom it may concern:*

Be it known that I, WALTER KRAUSE, a citizen of Germany, and resident of Friesack, Mark, Germany, have invented certain new and useful Improvements in Pipe Joints (for which I have filed applications in Germany, March 22, 1919, Gebrauchsmuster No. 787,802; Germany, January 22, 1920, Patent No. 335,733; Netherlands, October 21, 1919, Patent No. 5,814; Luxembourg, October 29, 1919, Patent No. 11,542; Spain, October 31, 1919, Patent No. 71,254; Hungary, November 5, 1919, Patent No. 79,547; Denmark, October 23, 1919, Patent No. 26,949; Finland, October 30, 1919, Patent No. 8,045; Austria, October 18, 1919, no patent issued as yet; Sweden, October 21, 1919, Patent No. 50,312; Italy, February 13, 1920, Patent No. 184/521; France, February 5, 1920, Patent No. 509,444; Belgium, January 27, 1920, Patent No. 284,590; Great Britain, January 27, 1920, Patent No. 141,020; Rumania, April 16, 1920, Patent No. 5,078; Canada, May 25, 1920, Patent No. 221,580; Poland, July 9, 1920, no patent issued as yet; and Czechoslovakia, March 30, 1921, no patent issued as yet), of which the following is a specification.

My invention relates to improvements in pipe joints, and more particularly in pipe joints for pipes which are mounted along straight lines, such for example as pipes for irrigation systems. Preferably joints of this class are constructed in such a way, that the flanges of the pipes are provided only at their upper and lower parts with connecting members or bolts, which connecting members are sufficient for example for properly coupling the sectional pipes of the field conduits of irrigation systems, because such pipes are not subject to lateral forces.

For jointing pipes formed at their ends with flanges the said pipes must be brought in line with each other, in order that the connecting members such as bolts can be passed through the bores provided therefor in the flanges. As the length and weight of the sectional sprinkling pipes of a field conduit are ordinarily such, that two men can just carry the same, and the attendants must bend forwards while making connection between pipe sections, the work of making the joint is rather troublesome and fatiguing.

The object of the improvements is to provide a joint which can readily be made or released. With this object in view the invention consists in providing the flange of one of the pipes at its upper or lower part with an outwardly open slit which is adapted to be engaged by the connecting member or bolt. Therefore, for making the joint the said flange is placed with its slit in holding engagement with the connecting member or bolt secured to the other flange, whereupon the pipes and flanges are in their proper positions. In the preferred form the flanges of both pipes are formed with slits for engaging cooperating connecting members, the slit on the flange of one pipe being on one side of the pipe axis, and the slit on the mating flange of the other pipe being on the opposite side of said axis. Thereby the making of the joint is considerably facilitated, one of the flanges being placed with its upper connecting member in engagement with the cooperating upwardly open slit of the other flange, and its downwardly open slit engaging the lower connecting member of the other flange.

For the purpose of explaining my invention an example embodying the same has been shown in the accompanying drawing, in which the same letters of reference have been used in all the views to indicate corresponding parts. In said drawing,—

Fig. 1, is a longitudinal section of the joint, and

Figs. 2 and 3 are end views of the flanges of the pipes.

The pipes 3 and 4 are provided with flanges 1 and 2 respectively. The flange 1 is formed at its upper side with a substantially radial outwardly open slit 9, and the flange 2 is formed at its lower side with a substantially radial open slit 10. At its upper side the flange 2 carries a rigid connecting member 5 adapted to enter the slit 9, and the flange 1 carries at its lower side a similar member 6 adapted to enter the slit 10. In the example shown in the figures the said members are in the form of bolts screwed into the flanges and formed with transverse slots for the passage of wedges 7 and 8 therethrough. The flanges 1 and 2 are formed in their rear faces with grooves 11 and 12 respectively providing in the assembled position of the joint bearing faces for the wedges 7 and 8. The bolts or connecting members 5, 6 are shown associated with nuts which hold said bolts in proper positions to effect registry of the wedge-guiding slits in the bolts, with the corresponding grooves 11 and 12 respectively, when the pipes are in position for coupling. Of course, upon loosening the nuts, the bolts may be turned about their axes to effect the proper adjustment.

For making the joint the pipe 3 is laid in such a way that the slit 9 is above the pipe and the bolt 6 below the same. Thereupon the pipe 4 is passed downwards so that the bolt 5 enters the slit 9 and the slit 10 receives the bolt 6. Finally the wedges 7 and 8 are secured in the slots of the bolts so as to clamp the joint together. By engaging in the grooves 11 and 12 the wedges lock the flanges as against vertical displacement relatively to each other. By thus hanging a pipe with its bolt and slit on the other one which has been laid before, the joint is readily made, as it is not necessary to insert screw bolts through corresponding holes made in the flanges while holding the heavy pipes in position.

I claim:

1. In a pipe joint, the combination, with the flanges of the pipes having at corresponding diametrically-opposite points, an outwardly-open slit and a connecting member respectively, said member being held permanently at a fixed angle to the flange carrying it, and being adapted to enter said slit by a radial movement, of means to lock said member within said slit.

2. In a pipe joint, the combination, with the flanges of the pipes having at corresponding diametrically-opposite points, an outwardly-open slit and a slotted bolt respectively, said bolt being adapted to enter said slit by a radial movement, of a wedge adapted to engage said slotted bolt and to lock it within said slit.

3. In a pipe joint, the combination, with the flanges of the pipes having at corresponding parts respectively an outwardly open slit and a groove, and a rigid slotted bolt, of a wedge adapted to engage said slotted bolt and groove and to lock the same in engagement with said slit.

4. In a pipe joint, the combination, with the flanges of the pipes having at corresponding points an outwardly-open slit and a connecting member respectively, said member being held permanently at a fixed angle to the flange carrying it, and being adapted to enter said slit by a radial movement, of wedging means for engaging said connecting member and said slitted flange.

5. In a pipe joint, the combination, with the flanges of the pipes having at corresponding diametrically-opposite points, an outwardly open slit and a bolt extending lengthwise of the pipe, said bolt being adapted to enter said slit by a radial movement, the flange having said slit being also provided with a groove adjacent to the slit, of wedging means movable transversely in engagement with said bolt and with said slitted flange at the groove thereof.

6. In a pipe joint, the combination, with the flanges of the pipes, one of said flanges having at its upper part an outwardly open slit and a groove disposed transversely thereof and at its lower part a rigid slotted bolt and the other one of said flanges having at its upper part a rigid slotted bolt and at its lower part an outwardly open slit and a groove disposed transversely thereof, of wedges adapted to be passed through said slotted bolts and to engage the grooves and to bind the flanges together.

7. In a pipe joint, the combination, with the flanges of the pipes having at corresponding parts respectively an outwardly open slit and a groove, and a slotted bolt, of a wedge adapted to engage said slotted bolt and groove and to lock the same in engagement with said slit.

8. In a pipe joint, the combination, with the flanges of the pipes to be connected, each of said flanges having at corresponding diametrically-opposite points, an outwardly-open slit and a connecting member respectively, said member being rigid with the flange carrying it, and being adapted to enter the corresponding slit of the other flange by a radial movement, of means to lock said member within said slit.

In testimony whereof I hereunto affix my signature in the presence of two witnesses.

WALTER KRAUSE.

Witnesses:
GRETE GUTZEIT,
ERNA BERNDT.